United States Patent [19]

Duhaut et al.

[11] 3,871,995

[45] Mar. 18, 1975

[54] REFORMING PROCESS USING PLATINUM-INDIUM-THALLIUM OR INDIUM CATALYST

[75] Inventors: Pierre Duhaut, LeVesinet; Jean Miquel, Paris, both of France

[73] Assignee: Societe Francaise Des Produits Pour Catalyse, Rueil-Malmaison, France

[22] Filed: Nov. 1, 1973

[21] Appl. No.: 412,035

Related U.S. Application Data

[62] Division of Ser. No. 267,946, June 30, 1972, Pat. No. 3,793,232.

[30] Foreign Application Priority Data

July 5, 1971  France .............................. 71.24567

[52] U.S. Cl. ................................ 208/138, 208/139
[51] Int. Cl. ............................................. C10g 35/06
[58] Field of Search ............................ 208/138, 139

[56] References Cited
UNITED STATES PATENTS

| | | |
|---|---|---|
| 2,814,599 | 11/1957 | Lefrancois et al. ............ 252/466 PT |
| 2,848,377 | 8/1958 | Webb ............................. 252/466 PT |
| 2,914,464 | 11/1959 | Burton et al. ....................... 252/442 |
| 3,790,504 | 2/1974 | Duhaut et al. ....................... 208/139 |

Primary Examiner—Delbert E. Gantz
Assistant Examiner—S. Berger
Attorney, Agent, or Firm—Millen, Raptes & White

[57] ABSTRACT

Catalyst for the conversion of hydrocarbons, particularly for reforming reactions having an alumina base and the following contents of metals expressed by weight with respect to the alumina:
platinum : from 0.005 to 1 percent
iridium : from 0.005 to 1 percent
thallium or indium : from 0.05 to 3 percent The catalyst may further contain optionally from 0.1 to 10 percent by weight of a halogen and up to 10 percent by weight of zinc or a zinc compound said proportions being also relative to the alumina weight.

9 Claims, No Drawings

REFORMING PROCESS USING PLATINUM-INDIUM-THALLIUM OR INDIUM CATALYST

This is a division, of application Ser. No. 267,946, filed June 30, 1972, now U.S. Pat. No. 3,793,232.

This invention concerns a new catalyst containing (a) alumina, (b) platinum, (c) iridium and (d) thallium or indium.

This invention also concerns the use of this catalyst in a reforming reaction or in other reactions for the conversion of hydrocarbons such as those of hydrogenation, dehydrogenation, isomerization or aromatization of hydrocarbons.

For a long time, catalysts have been known which contain platinum, said metal being deposited on alumina. More recently, many improvements have been made to this type of catalyst based on platinum and alumina; for example, it has been proposed to make use of a catalyst containing platinum and iridium, both metals being deposited on alumina (U.S. Pat. No. 2,848,377). It has been also suggested (U.S. Pat. No. 2,814,599) to make use in reforming operations of a catalyst containing platinum and indium or thallium deposited on alumina. But in spite of these improvements and of other improvements which have been proposed up to now, it is now apparent that the tendency is always to search for new catalysts based on platinum which, on the one hand, would result in still higher yields in the reforming reactions as well as in other hydrocarbon conversion reactions, on the other hand, would also have a catalyst life much longer than that of the previously used catalysts.

To attain such objectives, it has just been now discovered that much higher yields are achievable, particularly in the reforming reactions, by using a catalyst based on alumina, which contains simultaneously platinum, iridium and thallium or indium. But it has been chiefly discovered that, by using a catalyst based on alumina, containing simultaneously platinum, iridium and thallium or indium, the life of the catalyst is considerably increased, provided that critical amounts of thallium or indium are used.

The catalyst according to the invention must contain, by weight with respect to the catalyst carrier, from 0.005 to 1 percent of platinum (preferably 0.05 to 0.6 percent), 0.005 to 1 percent (and preferably from 0.01 to 0.09 percent) of iridium and 0.05 to 3 percent of thallium or indium.

Optionally, the catalyst may also contain from 0.1 to 10 percent and preferably from 0.2 to 5 percent, by weight with respect to the catalyst carrier, of a halogen, such, for example, as chlorine or fluorine. Still optionally, the catalyst may also contain up to 10 percent by weight of zinc or of a zinc compound, this percentage being expressed as zinc oxide.

The catalyst is prepared according to conventional methods. A method consists, for example, of: (a) impregnating the carrier (alumina) by means of an aqueous solution of a thallium or indium salt (having a valence of 1 or 2 or 3), for example a nitrate; (b) drying at about 120°C; (c) calcining under air for a few hours at a temperature from 500° to 1,000°C, preferably of about 700°C; and (d) then following with a second impregnation by means of a solution containing platinum and iridium (for example by means of a solution of hexachloroplatinic acid and hexachloroiridic acid).

Another method consists, for example, of impregnating the carrier by means of a solution containing simultaneously:
1. platinum (for example hexachloroplatinic acid)
2. thallium or indium (for example, thallium or indium chloride, bromide, fluoride, sulfate or acetate, or still any other thallium or indium salt soluble in water or in hydrochloric acid (thallium chloroplatinate for example)
3. iridium, and optionally
4. chlorine or fluorine.

The three metal elements may be introduced also optionally on the carrier by carrying out 3 successive impregnations in any order: for example, there are introduced:

first, the iridium by means of a solution containing the same, optionally followed by a drying or a calcining step;

then the platinum by means of a solution of for example, hexachloroplatinic acid, optionally followed with drying and calcining steps;

finally, the thallium and/or indium, this latter impregnation being necessarily followed by drying and then a calcining step at a temperature from about 300° to 700°C.

It must be understood that the order of the above mentioned impregnations is not obligatorily and may be different if desired.

Of course any platinum, iridium, indium or thallium compound, as previously proposed for taking part in a catalyst composition on an alumina carrier, may also be used. There will not be given any detailed list of such compounds. The types of alumina which can be used in such catalysts, particularly in the reforming catalysts, are also well known in the art.

It is known that the reforming reactions are generally carried out at a temperature from about 450° to 580°C, under a pressure from about 5 to 20 kg/cm$^2$, the hourly reaction rate being from 0.5 to 10 volumes of liquid charge (naphtha distilling between about 60°C and 220°C) per volume of catalyst.

When the obtained catalysts are used in chemical reactions other than reforming, the operating conditions and the composition of the catalyst will be adjusted in a known manner so as to be adapted to the new use. For example, in the case of a simple hydrogenation, it is preferred to operate between 200° and 400°C with a catalyst having little or no halogen content; for isomerization, catalysts with a high chlorine or fluorine content, for example 5 to 10 percent by weight or even more, are preferred, the temperatures being advantageously from 150° to 400°C.

The following examples are given for purposes of illustration and are not intended to limit in any way the scope of the invention.

EXAMPLE 1

There is treated a naphtha having the following characteristics:

| | |
|---|---|
| ASTM distillation | 80 – 160°C |
| Composition: aromatic hydrocarbons | 7 % by weight |
| naphthenic hydrocarbons | 27 % by weight |
| paraffinic hydrocarbons | 66 % by weight |
| Octane number "clear research" | about 37 |
| Average molecular weight | 110 |
| Specific gravity at 20°C | 0.782 |

This naphtha passes with recycled hydrogen over two catalysts A and B, containing 0.2 percent of platinum and 0.05 percent of iridium by weight with respect to the carrier which is an aluminia having a specific surface of 240 m²/g and a porous volume of 57 cc/g; the chlorine content of catalysts A and B is 1 percent. Catalyst A further contains 0.5 percent of thallium and catalyst B further contains 0.5 percent of indium (by weight with respect to the carrier).

Catalysts A and B have been prepared by adding to 100 g of alumina, 100 cc of an aqueous solution containing:

1.90 g of concentrated HCl (d = 1.19)

8 g of an aqueous solution of chloroplatinic acid with a 2 percent platinum content by weight 2.18 g of a chloroiridic acid solution with a 2.3 percent by weight content of iridium and, 1.06 g of thallium nitrate for catalyst A, or 1.87 g of indium nitrate for catalyst B.

The contact is maintained for 5 hours, and the alumina is dried for 1 hour at 100°C and then calcined at 530°C in dry air (drying of the air by means of activated alumina). The resulting alumina is then reduced under a stream of dry hydrogen (activated alumina) for 2 hours at 450°C. There are thus obtained catalysts A and B which contain:

0.2 percent of platinum 0.05 percent of iridium 0.5 percent of thallium (catalyst A) or 0.5 percent of indium (catalyst B)

1.16 percent of chlorine. The obtained catalyst A and B have a specific surface of 230m2/g and a pore volume of 54cc/g.

The operation is conducted so as to obtain a clear octane number of 96.2.

The experimental conditions are as follows:

| Pressure | 20 bars |
| Temperature | 490°C |
| Ratio H₂/hydrocarbon (moles) | 5 |
| Naphtha weight/catalyst weight/hour | 3 |

Table I below gives for the two catalysts A and B the yield of $C_5^+$ and the hydrogen percent contained in the recycled gas when the research octane number has been obtained.

TABLE I

| CATALYST | YIELD $C_5^+$ | RECYCLED GAS % $H_2$ |
| --- | --- | --- |
| A | 82.6 | 82.8 |
| B | 82.3 | 82.6 |

EXAMPLE 1A

This example is not part of the invention but is only given for of comparison.

Example 1 is repeated with the use of two catalysts C and D which do not contain iridium. The other characteristics of catalysts C and D are those of catalysts A and B used in example 1, except that the compositions of the metal elements vary slightly so that the total content of metal elements is identical in catalysts A–B and C–D; thus the catalyst C contains by weight with respect to the alumina, 0.25 percent of platinum and 0.5 percent of thallium, catalyst D contains by weight with respect to the alumina 0.25 percent of platinum and 0.5 percent of indium; both catalysts C and D contain 1.16 percent of chlorine.

The yields of $C_5^+$ and the hydrogen percent in the recycled gas when the research octane number (96.2) has been obtained, are given in the following table II.

TABLE II

| CATALYST | YIELD $C_5^+$ | RECYCLED GAS % $H_2$ |
| --- | --- | --- |
| C | 82.5 | 82.6 |
| D | 82.1 | 82.5 |

There are thus obtained, by use of catalysts C and D, results which are slightly inferior to those respectively obtained with catalysts A and B.

EXAMPLE 2

Table III shows that at mid-run, with the respective use of the catalysts C and D, the yields of $C_5^+$ and the hydrogen percent contained in the recycled gas are substantially lower than the yield of $C_5^+$ and the hydrogen percent contained in the recycled gas, as obtained by the use of the catalysts A and B.

TABLE III

| CATALYST | YIELD $C_5^+$ mid-run | RECYCLED GAS % $H_2$ mid-run |
| --- | --- | --- |
| A | 82.5 | 82.7 |
| C | 81.8 | 82.3 |
| B | 82.1 | 82.4 |
| D | 81.5 | 82.1 |

EXAMPLE 2A

Example 2 is repeated with the use, on the one hand, of catalyst $A_1$ and $B_1$, containing:

0.20 percent of platinum 0.05 percent of iridium 0.03 percent of thallium (catalyst $A_1$)

or 0.03 percent of indium (catalyst $B_1$)

1.16 percent of chlorine and by using, on the other hand, catalysts $A_2$ and $B_2$ containing:

0.20 percent of platinum 0.05 percent of iridium 3.5 percent of thallium (catalyst $A_2$)

or 3.5 percent of indium (catalysts $B_2$)

1.16 percent of chlorine

Table IV below shows that, at mid-run, with the use of catalysts $A_1$, $A_2$, $B_1$ and $B_2$, the yield $C_5^+$ and the hydrogen percent contained in the recycled gas are substantially similar to those obtained with the use of catalysts C and D which contain neither thallium nor indium.

TABLE IV

| CATALYST | YIELD $C_5^+$ mid-run | RECYCLED GAS % $H_2$ mid-run |
|---|---|---|
| $A_1$ | 81.7 | 82.3 |
| $B_1$ | 81.8 | 82.1 |
| $A_2$ | 81.6 | 82.1 |
| $B_2$ | 81.6 | 82.0 |

Examples 2 and 2A thus show that the catalyst life is greater for the catalysts containing alumina, platinum, iridium and thallium or indium, provided that critical amounts of thallium or indium are used.

What we claim as this invention is:

1. A catalytic reforming process comprising the step of passing hydrocarbons at elevated temperatures in contact with a catalyst,
   the improvement comprising employing as said catalyst a catalyst containing:
   a. alumina
   b. from 0.005 to 1 percent by weight of platinum with respect to the alumina
   c. from 0.005 to 1 percent of iridium by weight with respect to the alumina
   d. from 0.05 to 3 percent by weight, with respect to the alumina, of a metal selected from the group consisting of thallium and indium.

2. A process as defined by claim 1, said catalyst further containing from 0.1 to 10 percent of a halogen by weight, with respect to the alumina.

3. A process as defined by claim 1, said catalyst further containing less than 10 percent by weight, with respect to the alumina, of zinc or of a zinc compound, expressed as zinc oxide.

4. A process as defined by claim 1, said catalyst containing thallium as said metal.

5. A process as defined by claim 1, said catalyst containing indium as said metal.

6. A process as defined by claim 1, said catalyst containing 0.05–0.6 percent by weight of platinum with respect to the alumina.

7. A process as defined by claim 1, said catalyst containing 0.01–0.09 percent by weight of indium with respect to the alumina.

8. A process as defined by claim 6, said catalyst containing 0.01–0.09 percent by weight of indium with respect to the alumina.

9. A process as defined by claim 2, wherein said halogen is chlorine or fluorine in a percent by weight of 0.2–5 percent based on the alumina.

* * * * *